United States Patent [19]
Chatterjee et al.

[11] Patent Number: 5,358,913
[45] Date of Patent: * Oct. 25, 1994

[54] ZIRCONIA CERAMIC ARTICLES HAVING A TETRAGONAL CORE AND CUBIC CASING

[75] Inventors: Dilip K. Chatterjee; Debasis Majumdar; Syamal K. Ghosh; Jose M. Mir, all of Rochester, N.Y.

[73] Assignee: Eastman Kodak Company, Rochester, N.Y.

[*] Notice: The portion of the term of this patent subsequent to Mar. 11, 2011 has been disclaimed.

[21] Appl. No.: 107,878

[22] Filed: Aug. 18, 1993

Related U.S. Application Data

[63] Continuation of Ser. No. 846,646, Mar. 5, 1992, Pat. No. 5,290,332.

[51] Int. Cl.$^5$ ............................................. C04B 35/48
[52] U.S. Cl. .................................. 501/103; 501/104; 65/17.3; 428/34.6; 428/375; 428/402.24; 428/404; 428/636; 428/660
[58] Field of Search .................. 65/18.1, 18.3; 501/94, 501/104, 102, 103; 428/34.6, 357, 375, 402, 402.24, 403, 404, 409, 636, 660; 156/DIG. 95; 420/422

[56] References Cited

U.S. PATENT DOCUMENTS

| | | | |
|---|---|---|---|
| Re. 32,449 | 6/1987 | Claussen et al. | 501/103 |
| 4,279,655 | 7/1981 | Garvie et al. | |
| 4,360,598 | 11/1982 | Otagiri et al. | |
| 4,525,464 | 6/1985 | Claussen et al. | 501/103 |
| 4,626,518 | 12/1986 | Watanabe et al. | |
| 4,659,680 | 4/1987 | Guile | 501/103 |
| 4,900,492 | 2/1990 | Claussen et al. | 501/103 |
| 4,996,117 | 2/1991 | Chu et al. | 428/633 |
| 5,041,417 | 8/1991 | Agostinelli et al. | |

FOREIGN PATENT DOCUMENTS

| | | |
|---|---|---|
| 0067327 | 12/1982 | European Pat. Off. |
| 0129188 | 12/1984 | European Pat. Off. |
| 0163143 | 12/1985 | European Pat. Off. |
| WO83/04247 | 12/1983 | PCT Int'l Appl. |

OTHER PUBLICATIONS

Druschitz et al, "Hot Isostatic Pressing of a Presintered Yttria-Stabilized Zirconia Ceramic," *Journal of American Ceramic Society*, vol. 72(9), (1989), pp. 1591–1597.

Birkby et al, "The Effect of Surface Transformation on the Wear Behaviour of Zirconia TZP Ceramics," *Journal of the European Ceramic Society*, vol. 5, (1989), pp. 37–45.

Miyamoto et al, "HIP Treatment for $ZrO_2$ Coating Prepared by Low Pressure Plasma Spraying," *High Performance Ceramic Films and Coatings*, Elsevier Science Pub., (1991), pp. 56–65.

Fleischer et al, "Effect of Ion on the Hardness, Wear, and Friction of Zirconia," *J. Mater. Res.*, vol. 5, No. 2 (Feb. 1990), pp. 385–391.

Hioki et al, "Structural and Mechanical Properties of Ion-Implanted Yttria-Stabilized Zirconia," *Advances in Ceramics*, vol. 24, (1988), pp. 679–690.

Majumdar et al, "X-Ray Photoelectron Spectroscopic Studies on Yttria, Zirconia, and Yttria-Stabilized Zirconia," *Journal of Applied Physics*, vol. 70, No. 2 (Jul. 15, 1991), pp. 988–992.

"Yttria Stabilized Zirconia," Product Series Profile, Z-Tech Corporation, (Jan. 1990).

Chatterjee et al, Surface and Coatings Technology, vol. 54–55, No. 1–3, Nov. 1992, pp. 516–520.

*Primary Examiner*—W. Gary Jones
*Assistant Examiner*—Steven P. Griffin
*Attorney, Agent, or Firm*—Robert Luke Walker

[57] ABSTRACT

A method for preparing a ceramic article comprising compacting a particulate including a primary oxide and a secondary oxide to form a blank. The primary oxide is $ZrO_2$. The secondary oxide is selected from the group consisting of MgO, CaO, $Y_2O_3$, $Sc_2O_3$, rare earth oxides and combinations thereof. The blank is sintered in contact with oxide selected from the group consisting of MgO, CaO, $Y_2O_3$, $Sc_2O_3$ and rare earth oxides. The zirconia alloy ceramic articles produced have a cubic phase case and a tetragonal phase core.

2 Claims, 3 Drawing Sheets

ZIRCONIA CERAMIC ARTICLES HAVING A TETRAGONAL CORE AND CUBIC CASING

This is a continuation of application Ser. No. 846,646, filed Mar. 5, 1992 now U.S. Pat. No. 5,290,332.

BACKGROUND OF THE INVENTION

The present invention pertains to ceramic items and methods for preparing ceramic items and more particularly pertains to ceramic articles, tools, and methods for preparing ceramic articles and for sintering.

Zirconia ($ZrO_2$) is a ceramic material, which, in its tetragonal crystal structure, is strong and tough and can be made into tools and other articles, but has the shortcoming that it is relatively soft. Repeated wear and abrasion of the surfaces of a tetragonal zirconia part or tool, however, can cause a phase transformation of the surface from tetragonal phase to monoclinic phase, which is harder than tetragonal phase. The result is a tool which has a hard "case", that is, one or more hard outer surfaces, and a tough inner portion or "core", but the wear or abrasion may be uneven which presents another shortcoming. Zirconia also exists in a cubic crystallographic structure, which is even harder than monoclinic phase, but more brittle. Cubic phase zirconia requires high temperatures for its formation; however, an alloy of zirconia and an oxide of yttrium, magnesium, scandium, cerium or calcium can provide a stable cubic phase at room temperature.

SUMMARY OF THE INVENTION

It is an object of the invention to provide improved ceramic articles and tools, and improved methods for preparing ceramic articles and sintering; in which a substantially cubic zirconia alloy case is provided over a substantially tetragonal zirconia core. In the broader aspects of the method for preparing ceramic articles of the invention, there is provided a method for preparing a ceramic article comprising compacting a particulate including a primary oxide and a secondary oxide to form a blank. The primary oxide is $ZrO_2$. The secondary oxide is selected from the group consisting of MgO, CaO, $Y_2O_3$, $Sc_2O_3$, rare earth oxides and combinations thereof. The blank is sintered in that method and the method of sintering in contact with oxide selected from the group consisting of MgO, CaO, $Y_2O_3$, $Sc_2O_3$ and rare earth oxides.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawing wherein.

DESCRIPTION OF A SPECIFIC EMBODIMENT

In the methods of the invention, particulate zirconia alloy is compacted and sintered. The sintering is performed in the presence of a dopant, which is discussed below in detail. The resulting ceramic article of the invention has a substantially cubic structure case and a substantially tetragonal structure core.

Figure 1:
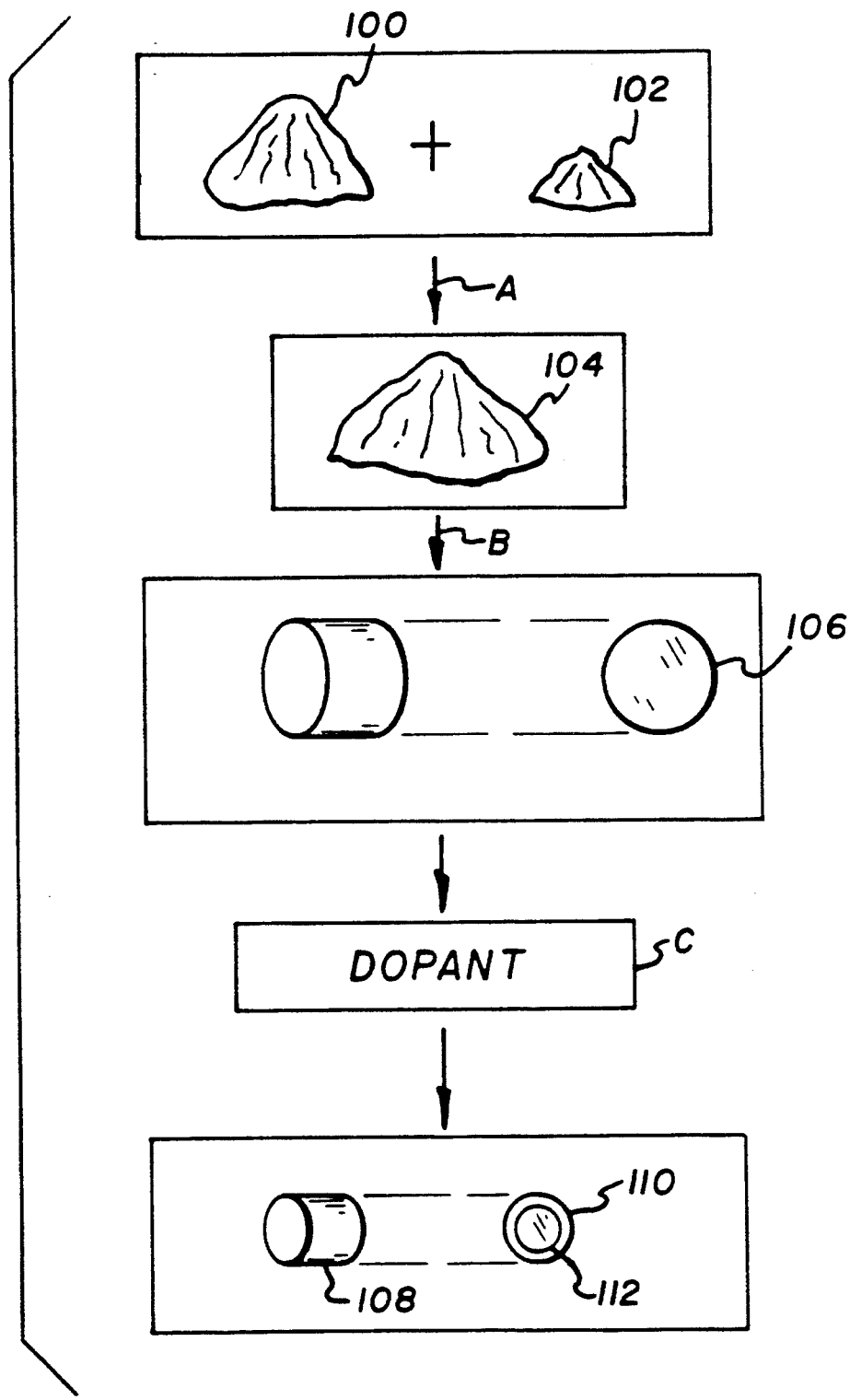
FIG. 1 is a schematic diagram of the method of the invention.

The methods of the invention utilize particulate alloys of $ZrO_2$ and additional oxide selected from: MgO, CaO, $Y_2O_3$, $Sc_2O_3$ and $Ce_2O_3$ and other rare earth oxides (also referred to herein as "Mg-Ca-Y-Sc-rare earth oxides"). Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having about 2 to about 20 mole percent Mg-Ca-Y-Sc-rare earth oxide exhibit a tetragonal structure. Preferred oxides for alloying with zirconia are $Y_2O_3$, MgO, CaO, $Ce_2O_3$ and combinations of these oxides. Step "A" in FIG. 1, diagrammatically illustrates the alloying process. Zirconia powder 100 is combined with one or more secondary oxide powders 102 to provide zirconia alloy powder 104. It is preferred that the zirconia powder have a high purity, greater than about 99.9 percent. The preparation of zirconia alloys is well known to those skilled in the art and zirconia alloys are available commercially. For example, particulate zirconia alloy having 3 mole percent $Y_2O_3$ is marketed by Z-TECH Corporation, Bow, N.H., as "SY-ULTRA 5.2 Yttria Stabilized Zirconia".

The grain and agglomerate sizes and distributions, moisture content and use of binder in the zirconia alloy are selected in a manner well known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. An example of useful grain and agglomeration sizes and distributions for a particular embodiment of the invention is the following. The grain size is from about 0.1 micrometers to about 0.6 micrometers. The average grain size is 0.3 micrometers. The distribution of grain size is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is 40–60 micrometers. Moisture content of the powder is about 0.2 to 1.0 percent by volume of blank and is preferably 0.5 percent. The alloy powder is compacted in the presence of a binder such as gelatin or polyvinyl ionomer or more preferably polyvinyl alcohol. The binder is added to and mixed with the powder, for example by spraying or ball milling prior to placement of the powder in a compacting device.

Specific examples of alloys useful in the methods of the invention include: tetragonal structure zirconia alloys having from about 2 to about 5 mole percent $Y_2O_3$, or more preferably about 3 mole percent $Y_2O_3$. Examples of tetragonal structure zirconia alloys useful in the methods of the invention are disclosed in U.S. patent application Ser. No. 07/816,646, by Syamal K. Ghosh, Dilip K. Chatterjee, and Dennis R. Koziol, filed Dec. 31, 1991, which is hereby incorporated herein by reference. In U.S. patent application Ser. No. 07/816,646, the alloy is selected so as to provide a "net shape" ceramic article as that term is defined therein: a ceramic article that is dimensionally true after sintering and therefore does not necessitate further machining prior to use in its intended working environment. In other words, the amount of shrinkage during sintering is predictable, producing a ceramic part that conforms to a predetermined shape and dimensions. The particulate zirconia alloy is substantially uniform. Purity of the alloy is well controlled at 99.9 to 99.99 percent, that is, impurities are no more than about 0.1 to 0.01 percent. Grain size is from about 0.1 micrometers to about 0.6 micrometers. Average grain size is 0.3 micrometers. The distribution of grain size is: 10 percent less than 0.1 micrometers, 50 percent less than 0.3 micrometers, and 90 percent less than 0.6 micrometers. Surface area of each individual grain ranges from about 10 to about 15 $m^2$/gram and is preferably 14 $m^2$/gram. Agglomerate size is from about 30 to about 60 micrometers. Average agglomerate size is 50 micrometers. Moisture content of the powder is about 0.2 to 1.0 percent by volume of blank and is preferably 0.5 percent.

In addition to being compacted, the zirconia alloy powder 104 is: heated to a temperature range at which sintering will occur; sintered, that is, maintained at that temperature range for a period of time; and then cooled. During all or part of sintering, the zirconia alloy powder 104 is in contact with dopant, as discussed below in detail. Compaction and sintering are generally discussed herein as two consecutive operations, as indicated by "B" and "C" in FIG. 1, however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank", which is illustrated as element 106 in FIG. 1. Blank 106 is at least partially compacted and is either unsintered or not fully sintered. Completion of compacting and sintering provides the finished ceramic article 108, which has a substantially cubic phase case 110 and a substantially tetragonal phase core 112.

The particular method of compacting the zirconia alloy powder is not critical. In a preferred embodiment of the invention, the particulate zirconia alloy is cold compacted to provide an unsintered blank, which is also referred to herein as a "green preform". The terms "cold compaction" and the like refer to compression of the particulate alloy at a temperature below glass transition or decomposition temperature of the binder. The green preform can be produced by such methods as cold uniaxial pressing, cold isostatic 0 pressing, or cold extrusion. The alloy powder is preferably subjected to uniform compacting forces in order to provide a blank 106 which has a uniform density.

Figure 2:
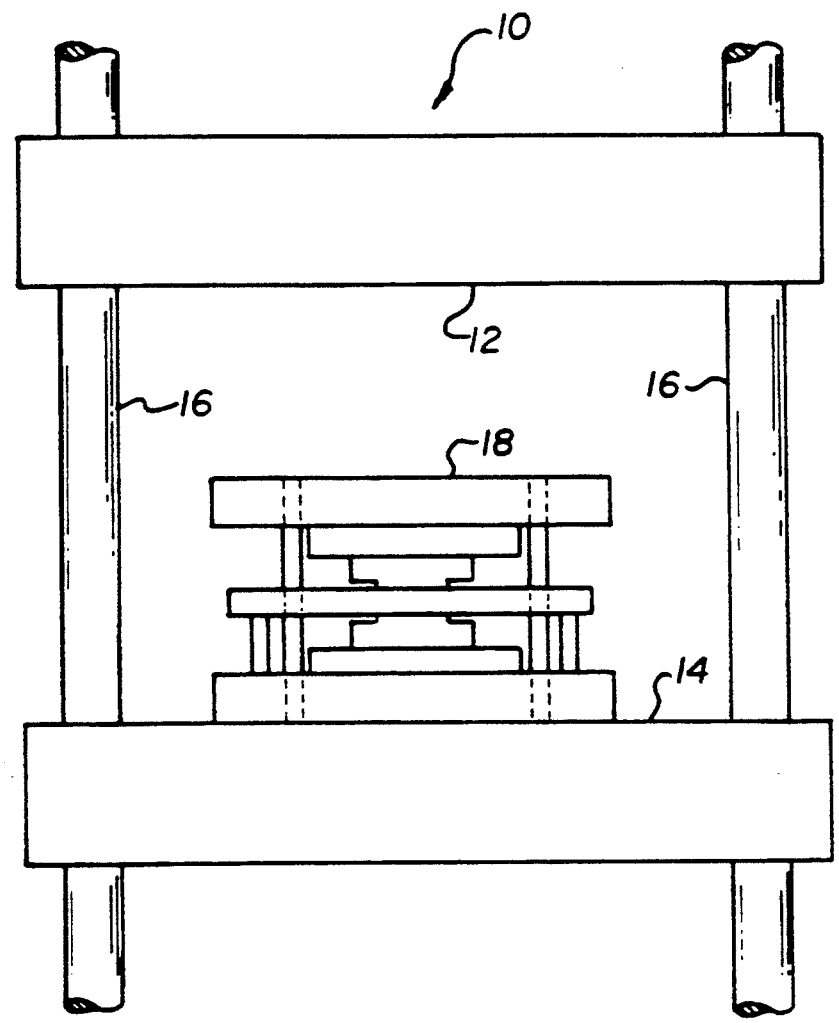
FIG. 2 is a fragmentary, cross-sectional view of a die press useful in the method of the invention.
Figure 3:
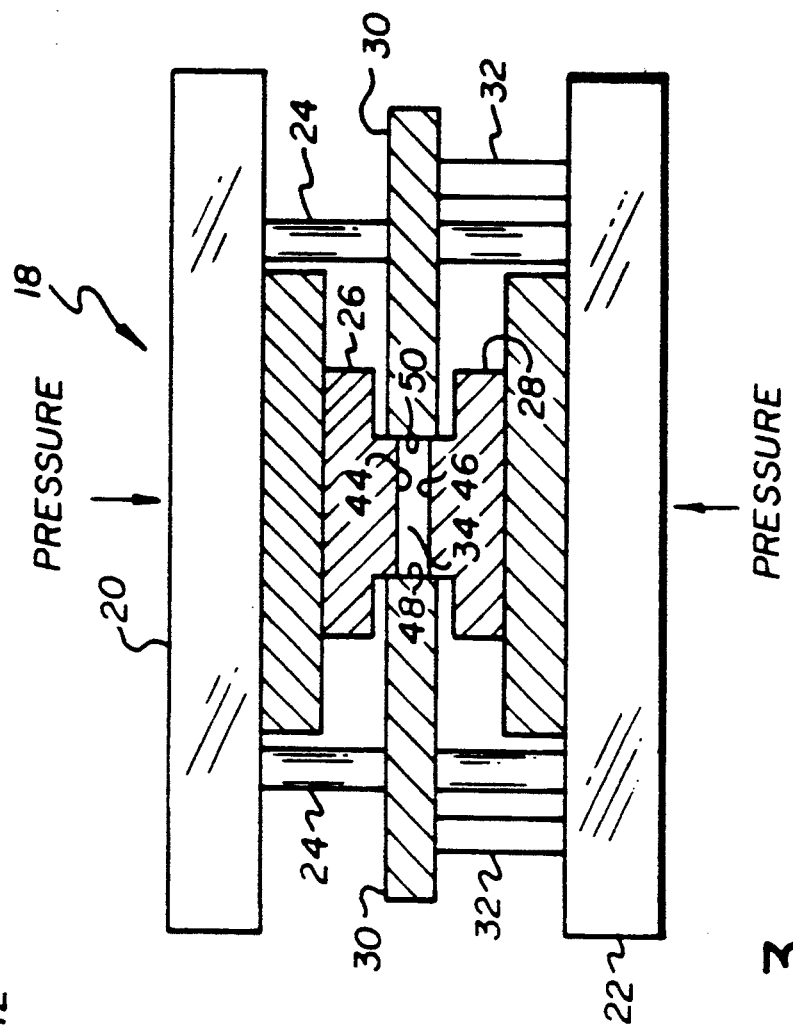
FIG. 3 is an enlarged cross-sectional view of the mold and die assembly of the die press of FIG. 2.

A preferred compacting device that achieves uniform compacting forces is a floating mold die press 10, as disclosed in U.S. patent application Ser. No. 07/816,646 and as shown in FIG. 2. Die press comprises fixed platform 12 and movable platform 14 mounted on supports 16. Movable platform 14 is driven by hydraulic means (not illustrated) and supports mold and die assembly 18. FIG. 3 further illustrates assembly 18 as comprising plates 20,22, which are slideably mounted on rods 24. Die sets 26,28 are mounted respectively on plates 20,22. Center platen 30 is mounted by spacer plates 32 on plate 22, and together with die sets 26,28 defines cavity 34 therebetween. The zirconia alloy is compacted by first placing in cavity 34, a selected amount of zirconia alloy powder mixed with binder. Platform 14 is then moved in the direction illustrated by the direction arrow in FIG. 2 so that plate 20 contacts platform 12 with a hydraulic pressure in the above described range, forcing plate 22 toward plate 20 and thereby compacting the powder to form the blank or green preform. The compaction forces exerted on the powder are substantially uniform because plates 20,22 are each free to move on rods 24, resulting in a blank having a uniform density.

Mold and die assembly 18 should have dimensionally close tolerances in order to minimize or eliminate the need for post-sintering machining of working surfaces of the finished ceramic article. For example, compaction surfaces 44,46 of respective die sets 26,28 can be parallel with a maximum design deviation from parallel of plus or minus 0.00005 inches. Compaction surfaces 48,50 of center platen 30 can be perpendicular to surfaces 44,46 and have a maximum design deviation from perpendicularity of plus or minus 0.00005 inches. The fill ratio should be established to produce a blank of a desired dimension, which after sintering will result in a ceramic of the final desired dimension. "Fill ratio" is the ratio of the height of cavity 34 taken along the axis of movement of platform 14 with platform 14 in its initial, lowermost position, to the height of the green part formed in cavity 34 taken along the axis of compaction of the powder in cavity 34. In other words, such height of the green preform also equals the distance between compaction surfaces 44,46 of mold and die assembly 18 at the final end-of-compacting position.

In a preferred method of the invention, the alloy powder is cold compacted to a "green" density which is substantially less than the tetragonal structure final sintered density, that is, the density of the green preform 106 is substantially less than the density of a tetragonal structure ceramic article 108 produced from that green preform 106 after sintering. The final sintered density of a completely tetragonal structure ceramic article differs slightly from the final sintered density of a ceramic article 108 of the invention in that articles 108 produced by the methods of the invention have a substantially cubic structure case 110 and a substantially tetragonal structure core 112. Except for very small articles 108, this difference can be ignored and final sintered density can be considered the density of the article 108 produced by the methods of the invention after sintering. It is preferred that the green density be between about 40 and about 65 percent of the tetragonal structure final sintered density, or more preferably be about 60 percent of the tetragonal structure final sintered density. In an example from a particular embodiment of the invention, an article 108 produced from a zirconia alloy having 3 mole percent $Y_2O_3$ has a final sintered density of 6.08 grams/cc, a range of preferred green densities of from about 2.5 to about 4.0 grams/cc, and a more preferred green density of about 3.65 grams/cc.

For a particular powder distribution, the green density is largely dependent upon the compaction pressure and the fill ratio. Preferred compaction pressures in the methods of the invention are about 10,000–30,000 psi (69–207 MPa). A more preferred compaction pressure is about 15,000 psi (about 100 MPa). The fill ratio is maintained at from about 2.5 to 1 to about 3.5 to 1. A preferred fill ratio is about 3.0 to 1. Compaction time can be readily determined by the operator depending upon the compaction pressure selected. Compaction time, for example, can be in the range of from about 60 seconds to about 10 seconds for compaction pressures in the range of about 12,000 psi to about 18,000 psi, respectively. For a compaction pressure of 15,000 (100 MPa), the compaction time can be 30 seconds. It is well known that the compaction pressure and time selected by the operator can be dependent upon the size of the finished part 108. Generally, as the part size increases, compaction pressure or compaction time or both is increased.

Sintering provided in the methods of the invention is unlike previous zirconia alloy sintering procedures. It is ordinary practice in previous tetragonal structure zirconia alloy sintering procedures to place a blank upon a plate of $ZrO_2$ or $Al_2O_3$ during sintering. The ceramic parts produced by those procedures have a tetragonal structure both on the surface and within the part. It is a novel and surprising feature of the methods of the invention that the sintering is carried out on the blank and on an oxide selected from: MgO, CaO, $Y_2O_3$, $Sc_2O_3$ and $Ce_2O_3$ and other rare earth oxides, and combination thereof, also referred to herein as "dopant", in contact with blank. The oxide or oxides of dopant can be the same or different than the oxide or oxides already alloyed with the $ZrO_2$. The result of the methods of the invention is an article or tool 108 in which a substantially cubic structure zirconia alloy case 110 overlays a substantially tetragonal structure zirconia alloy core 112. In a particular embodiment of the invention, the case has a crystal structure which is predominantly cubic with 10 percent or less tetragonal or monoclinic structure.

It is preferred that the sintering result in a ceramic article 108 having a "full" or nearly theoretical density, and it is more preferred that the density of the ceramic article 108 be from about 99.5 to about 99.9 percent of theoretical density. In an example from a particular embodiment of the invention, an article produced from a zirconia alloy having 3 mole percent $Y_2O_3$ has a final sintered density of 6.05–6.08 grams/cc with a grain size of less than 1 micrometer and preferably less than 0.5 micrometers.

Sintering is conducted in air or other oxygen containing atmosphere. Dopant, an oxide selected from: MgO, CaO, $Y_2O_3$, $Sc_2O_3$ and $Ce_2O_3$ and other rare earth oxides, is in contact with the blank during sintering. The methods of the invention are not limited to any particular sintering pressure and temperature conditions. Sintering can be performed at atmospheric pressure or alternatively a higher pressure can be used during all or part of the sintering to reduce porosity. The sintering is continued for a sufficient time period for the case of the article being sintered to reach a thermodynamic equilibrium structure. The thermodynamic equilibrium structure for the case of the article, which is in contact with the dopant, is cubic. The core is not in contact with the dopant and continues to have a tetragonal equilibrium structure. An example of a useful range of elevated sintering pressures is from about 69 MPa to about 207 MPa, or more preferably about 100–103 MPa. An example of a useful range of sintering temperatures is from about 1400° to about 1600° C., or more preferably about 1500° C. An example of a useful range of sintering times is from about 1 hour to about 3 hours or more preferably about 2 hours. In a particular embodiment of the methods of the invention, the sintering peak temperature is 1500° C. and that temperature is maintained for about 2 hours.

It is preferred that the sintered blank be slowly heated to sintering temperature and slowly cooled so as to avoid undesirable dimensional changes and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

The exact manner in which the dopant selected from: MgO, CaO, $Y_2O_3$, $Sc_2O_3$ and $Ce_2O_3$ and other rare earth oxides, is in contact with the blank during sintering is not critical, however, the cubic structure case is limited to those areas of the blank in contact with the dopant during sintering. It is not critical that the dopant be in contact with the blank during initial sintering, that is, sintering which does not result in an increase in density to full density. The examples illustrate some alternatives for providing contact between the blank and the dopant during sintering. In Example 1, the blank rested on a dopant plate during sintering. In Comparative Example 1, a blank resting on an inert plate retained a completely tetragonal structure. In Example 2, blanks rested on inert plates on which had been sprinkled dopant powder. In Example 3, dopant was provided by metallo-organic decomposition (MOD). In MOD, a metallo-organic precursor of a ceramic material is dissolved in a solvent and layered over a substrate which is then thermally decomposed at a temperature of about 500° to 600° C. to yield metal oxide. Dopant precursor coatings can be applied in MOD by spinning or by other means such as dipping. Other dopant precursors: metalloorganics, organo-metallics and inorganic metal salts, which yield dopant upon decomposition at a temperature less than the sintering temperature of the zirconia alloy, can be applied in a manner comparable to MOD. MOD and other procedures in which dopant is applied through a liquid may provide better coverage of the blank with dopant than procedures, like those in Examples 1 and 2, in which the dopant is supplied as a solid. An advantage may also be presented by methods such as dipping in that complex three dimensional shapes can be readily coated.

The dopant, selected from: MgO, CaO, $Y_2O_3$, $Sc_2O_3$ and $Ce_2O_3$ and other rare earth oxides, must be present during sintering of the blank. Comparative Example 2 makes it apparent that the provision of the dopant only during a resintering of a previously fully sintered preform does not result in the formation of a cubic zirconia alloy cast.

Figure 4:
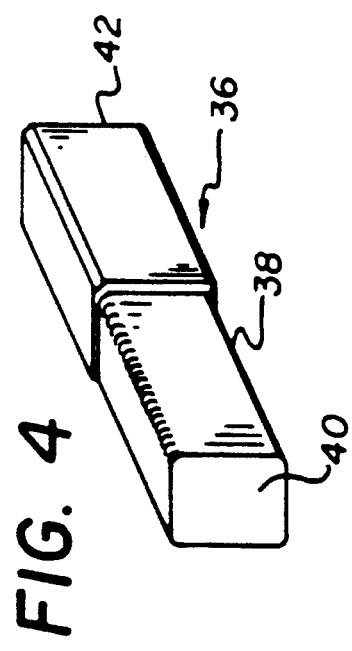
FIG. 4 is an enlarged schematic view of a ceramic perforator punch according to the invention.

The methods of the invention are applicable to the production of a variety of articles, particularly cutting tools and abrasion and wear resistant parts, in that many tools have a longer service life if the working surface is a hard cast overlying a tough core. Examples of tools include slitter knives, punches and dies; for cloth, cardboard, metal, polymeric materials and paper coated with abrasive material such as silver halides and the like. FIG. 4 illustrates a ceramic perforator 38 having cutting edge 40 mounted on mounting shank 42. Perforator can be mounted by shank 42 on any typical punch assembly, such as a reciprocating punch or a rotary punch upon which can be mounted a plurality of punches 36. The case of perforator 38 can be limited to cutting edge 40 or can encompass the entire outside of perforator. Typical hardnesses for cubic zirconia casts of articles prepared by the methods of the invention are 15–17 GPa. This contrasts with hardnesses of 12–13 GPa typical of tetragonal zirconia. The configuration of articles prepared by the methods of the invention is limited by the requirements of cold compaction and sintering; for example, mold size and shape and sintering oven size and shape; but is not believed to be subject to other limitations. The methods and articles of the invention are not limited to discrete ceramic items, thus the terms blank and ceramic article and the like, used herein can also refer to portions of larger items.

Although the claimed inventions are not limited by any particular theory or explanation, a theoretical explanation of the invention can be proposed. It is believed that the sintering temperatures used in the methods of the invention permit the formation of a solid solution of zirconia and dopant at the surface of the blank, which has a eutectoid composition that includes an elevated concentration of dopant. The case is believed to form as a result of a diffusion process from that surface of blank.

The following Comparative Examples and Examples are presented for a further understanding of the invention:

COMPARATIVE EXAMPLE 1

Zirconia alloy having 3 mole percent $Y_2O_3$ was obtained as a prepared alloy powder from Z-TECH Corporation, Bow, N.H. The alloy powder had an agglomerate size range from 30 micrometers to 60 micrometers, an average agglomerate size of 50 micrometers, a grain size range from 0.1 micrometer to 0.6 micrometer, an average grain size of 0.3 micrometers, and a moisture content of 0.5 percent by volume. Polyvinyl alcohol in the amount of 4 percent by volume of the green part was added to the ceramic powder as a binder and mixed thoroughly by ball milling. The powder was compacted in the floating mold die press above described, at a compacting pressure of 15,000 psi (100 MPa) for 30 seconds and with a fill ratio of about 3.0, to compact the powder into a blank. The blank was placed on a tetragonal zirconia plate during sintering and was sintered by sequentially heating the green part from room temperature to 300° C. at a rate of 0.3° C./min., from 300° C. to 400° C. at a rate of 0.1° C./min., from 400° C. to 600° C. at a rate of 0.4° C./min., from 600° C. to 1500° C. at a rate of 1.5° C./ min.; then maintaining the preform at 1500° C. for 120 minutes; and then sequentially cooling the part from 1500° C. to 800° C. at a rate of 2° C./minute, from 800° C. to room temperature at a rate of 1.6° C./minute. Dimensional shrinkage was uniform throughout the ceramic article to within 0.001 percent.

X-ray diffraction analysis was performed using a Model RU300 X-ray diffractometer manufactured by Rigaku Corp. of Japan. Coupled angle diffraction was used to detect the phases present at the core. Glancing angle diffraction was used to detect phases present at the cases. Results are presented in Table 1.

Knoop indentation hardness was measured for indicated Comparative Examples and Examples as a function of load using a Tukon Microhardness Tester, Model #300 FM/DF. All measurements were made on flat and smooth (RMS less than 40 microns) surfaces. Nominal indentation load was 500 gf and an average was taken of at least ten indentation readings. Hardness values measured by Knoop indentation were in the range 12–13 GPa.

Coefficients of friction were determined in a test device in which a rider was mounted on one end of a horizontally oriented arm. The rider was ball-shaped with a diameter of 12.5 millimeters. Two rider materials were used: tetragonal structure zirconia alloy having 3 mole percent $Y_2O_3$ and $Al_2O_3$. The arm was loaded down with a normal force of 500 grams (4.9 Newtons) and a counterweight was located opposite the rider to balance the normal force of the rider on the counterface. The ball rode on the counterface, that is, the surface of the ceramic article, in a reciprocating motion having a 13 millimeter long stroke at 100 cycles per minute. The test was run for 2 hours, at which time a measurable wear scar was noticed. The wear scar was traced with a stylus profilometer and the wear voltume was calculated. The coefficient of friction was determined from the relationship of $F = \mu N$, where F is the tangential force exerted by the ball on the counterface and measured by the transducer, N is the normal load of 4.9 Newtons placed on the arm holding the ball and $\mu$ is the coefficient of friction. The apparatus was calibrated using standard couples (rider and counterface) for $\mu$ in the range of 0.1 to 0.9. For example, a steel ball riding on a Teflon counterface generates a $\mu$ value of 0.1 and an aluminum oxide ball riding on an aluminum oxide counterface generates a $\mu$ value of 0.9. Results are presented in Tables 3 and 4.

COMPARATIVE EXAMPLE 2

The procedures of Comparative Example 1 were followed with the exception that after sintering the article was coated by MOD precursor of MgO as follows. The precursor solution was prepared by mixing magnesium carbonate in toluene then adding the mixture to a 1:1 (volume/volume) mixture of 2-ethylhexanoic acid and toluene and filtering through 1 micron filter paper. The filtrate was concentrated in a rotary evaporator and spin coated on the blank at 5000 rpm for 60 seconds. The article was then sintered again using the same sintering procedure, following which X-ray diffraction analysis was performed and coefficients of friction were determined as in Comparative Example 1. Results are presented in Tables 1, 3 and 4.

COMPARATIVE EXAMPLE 3

The procedures of Comparative Example 1 were followed with the exception that after sintering the blank, the coefficients of friction were determined as in Comparative Example 1, then the article was polished with 15 micrometer diamond paste to convert the structure of the case to monoclinic. The coefficients of friction were again determined and X-ray diffraction analysis was then performed as in Comparative Example 1. Results, are presented in Tables 1, 3 and 4. Hardness values measured by Knoop indentation were in the range 15–16 GPa.

EXAMPLE 1

The procedures of Comparative Example 1 were followed with the exception that the blank was sintered on an MgO plate. Coefficient of friction and X-ray diffraction analysis results are presented in Tables 2–4. Hardness values measured by Knoop indentation were in the range 15–17 GPa.

EXAMPLE 2

The procedures of Comparative Example 1 were followed with the exception that the blank was sintered on an $Al_2O_3$ plate on which was sprinkled very fine (0.3 micrometer) MgO powder. Coefficient of friction and X-ray diffraction analysis results are presented in Tables 2–4.

EXAMPLE 3

The procedures of Comparative Example 2 were followed with the exception that the blank was coated with MOD precursor of MgO prior to sintering and the article was not sintered a second time. Coefficient of friction and X-ray diffraction analysis results are presented in Tables 2–4.

TABLE 3

COEFFICIENTS OF FRICTION USING RIDER OF TETRAGONAL STRUCTURE ZIRCONIA ALLOY HAVING 3 MOLE PERCENT $Y_2O_3$

| Example or Comparative Example | Counter-face material | Rider volume loss (in $10^{-4}$ $mm^3$) | Counterface volume loss (in $10^{-4}$ $mm^3$) | Coefficient of friction |
|---|---|---|---|---|
| Example 1 | Cubic | 2.46 | 0 | 0.36 |
| Comparative Example 1 | Tetragonal | 32.07 | 254.75 | 0.64 |
| Comparative Example 3 | Monoclinic | 4.42 | 0 | 0.64 |

TABLE 1

COMPARATIVE EXAMPLES
X-RAY DIFFRACTION SCANS FROM 2 THETA = 20–40 DEGREES, Cu K ALPHA

Peaks observed at 2 theta degrees:

| # | Scanning Angle | 28.2 M(−111) | 30.3–5 T(111) | 31.5 M(111) | 34.7 T(002) C(200) | 35.2–3 T(200) | Comments |
|---|---|---|---|---|---|---|---|
| 1 | glancing | absent | very strong | absent | strong / absent | strong | |
| Interpretation: tetragonal phase | | | | | | | |
| 1 | coupled | absent | very strong | absent | strong / absent | strong | |
| Interpretation: tetragonal phase | | | | | | | |
| 2 | glancing | weak | very strong | weak | strong / absent | strong | |
| Interpretation: tetragonal phase predominant monoclinic phase at minor level (1–10%) | | | | | | | |
| 3 | glancing | absent | very strong | absent | strong / absent | strong | not polished |
| Interpretation: tetragonal phase | | | | | | | |
| 3 | coupled | absent | very strong | absent | strong / absent | strong | not polished |
| Interpretation: tetragonal phase | | | | | | | |
| 3 | glancing | weak | very strong | absent | strong / absent | strong | polished |
| Interpretation: tetragonal phase predominant monoclinic phase at minor level (1–10%) | | | | | | | |
| 3 | coupled | weak | very strong | absent | strong / absent | strong | polished |
| Interpretation: tetragonal phase predominant monoclinic phase at minor level (1–10%) | | | | | | | |

TABLE 2

EXAMPLES
X-RAY DIFFRACTION SCANS FROM 2 THETA = 20–40 DEGREES, Cu K ALPHA

Peaks observed at 2 theta degrees:

| # | Scanning Angle | 28.2 M(−111) | 30.3–5 T(111) | 31.5 M(111) | 34.7 T(002) C(200) | 35.2–3 T(200) | Comments |
|---|---|---|---|---|---|---|---|
| 1 | glancing | absent | very strong | absent | weak / absent | weak | |
| Interpretation: cubic phase predominant tetragonal phase at minor level (1–10%) | | | | | | | |
| 1 | coupled | absent | very strong | absent | strong / absent | strong | |
| Interpretation: tetragonal phase | | | | | | | |
| 2 | glancing | absent | very strong | absent | weak / strong | weak | |
| Interpretation: cubic phase predominant tetragonal phase at minor level (1–10%) | | | | | | | |
| 3 | glancing | weak | very strong | weak | absent / strong | absent | |
| Interpretation: cubic phase predominant monoclinic phase at minor level (1–10%) | | | | | | | |

TABLE 4

| | | COEFFICIENTS OF FRICTION USING $Al_2O_3$ RIDER | | |
|---|---|---|---|---|
| Example or Comparative Example | Counterface material | Rider volume loss (in $10^{-4}$ mm$^3$) | Counterface volume loss (in $10^{-4}$ mm$^3$) | Coefficient of friction |
| Example 1 | Cubic | 3.27 | 0 | 0.49 |
| Comparative Example 1 | Tetragonal | 4.81 | .0063 | 0.56 |
| Comparative Example 3 | Monoclinic | 1.69 | 0 | 0.55 |

The methods and articles of the invention have the advantage of providing a ceramic article which has a tough tetragonal structure core and a hard cubic structure case.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

What is claimed is:

1. A sintered ceramic article including a core and a casing, said casing being exterior to and continuous with said core, said core consisting of a mass of sintered particles having a tetragonal crystalline structure and an elemental composition including Zr, O, and at least one element selected from the group consisting of Mg, Ca, Y, Sc and rare earth elements, said casing consisting of a mass of sintered particles having a cubic crystalline structure and an elemental composition including Zr, O, and at least one element selected from the group consisting of Mg, Ca, Y, Sc and rare earth elements.

2. The sintered ceramic article of claim 1 wherein said particles of said core and said casing have a grain size from about 0.1 to about 0.6 micrometers and an agglomerate size from about 30 to about 60 micrometers before sintering.

* * * * *